United States Patent [19]
Gallagher

[11] 3,858,913
[45] Jan. 7, 1975

[54] FLUID COUPLING ASSEMBLY

[76] Inventor: Stephen F. Gallagher, 23 Eisenhower Dr., Norton, Mass. 02766

[22] Filed: May 18, 1972

[21] Appl. No.: 254,637

[52] U.S. Cl. ............................... 285/238, 285/319
[51] Int. Cl. ............................................. F16l 33/00
[58] Field of Search ............ 285/DIG. 22, 319, 317, 285/314, 238, 308, 309, 382, 7, 259

[56] References Cited
UNITED STATES PATENTS

| | | | |
|---|---|---|---|
| 115,917 | 6/1871 | Wharton | 285/DIG. 22 |
| 2,198,905 | 4/1940 | Content | 285/7 |
| 2,233,471 | 3/1941 | Clements | 285/7 |
| 2,455,544 | 12/1948 | Yonkers | 285/7 |
| 3,245,703 | 4/1966 | Manly | 285/DIG. 22 |
| 3,603,620 | 9/1971 | Nakata | 285/238 |
| 3,667,785 | 6/1972 | Kapeker | 285/DIG. 22 |

*Primary Examiner*—W. C. Reynolds
*Assistant Examiner*—Alex Grosz

[57] ABSTRACT

A fluid coupling assembly for non-metallic tubing comprising two members, one located within the other. One member provides a means of sealing the tubing. The other member provides a means of retaining the tubing. Resilient latch means are provided to hold the members and tubing in coupled relationship, and means are provided to disengage the latches.

3 Claims, 5 Drawing Figures

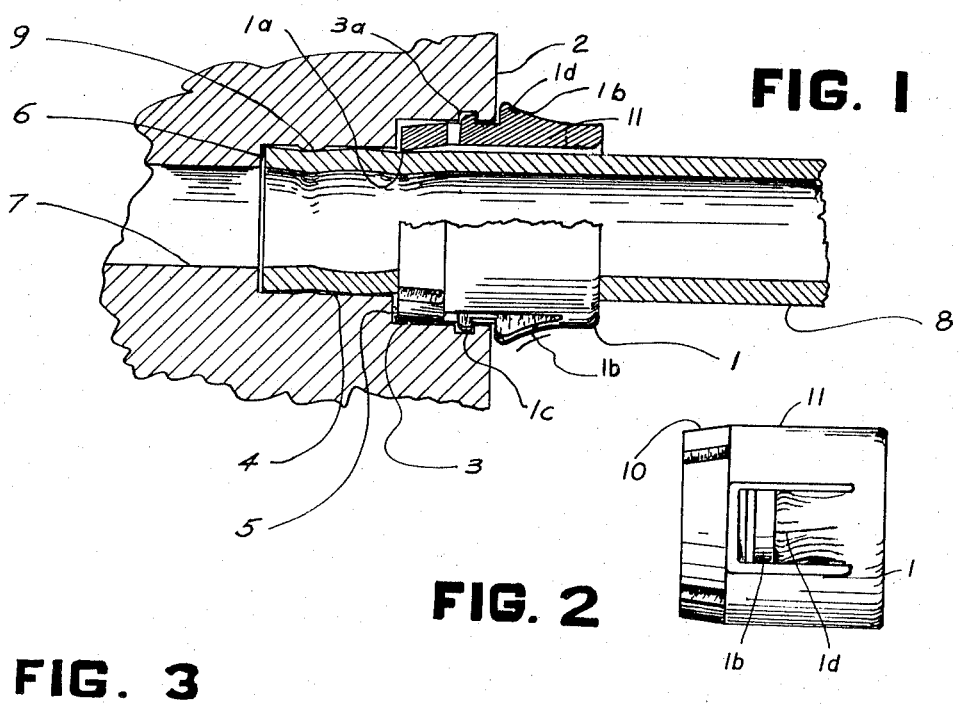
FIG. 1
FIG. 2
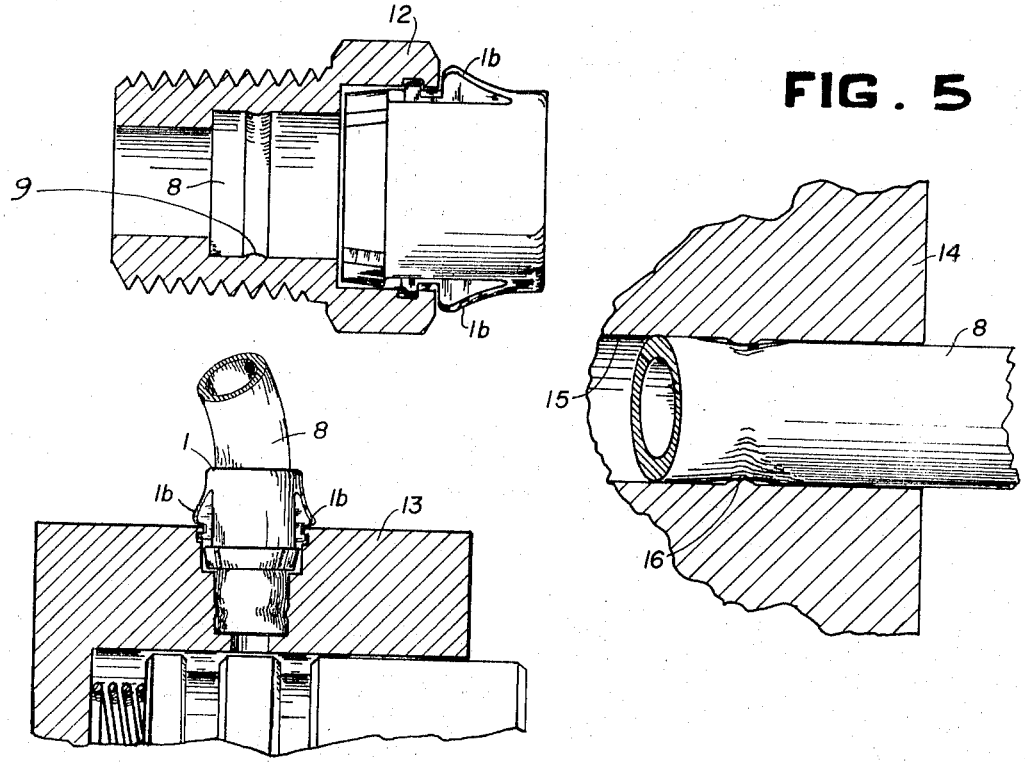
FIG. 3
FIG. 5
FIG. 4

FLUID COUPLING ASSEMBLY

FIELD BACKGROUND

The present invention relates to a fluid coupling assembly for providing an easily assemblable and disassemblable connection between non-metallic tubing and connectors, valves, actuators, vessels, measuring instruments, and manifolds.

BACKGROUND OF PRIOR ART

Prior art shows that heretofore such devices usually fall into two categories:

Type (A) A device having a portion which enters said tubing and, in which, by means of a threaded cup member and sleeve, said tubing is compressed radially between said entered portion and sleeve, thus retaining the tubing and causing a fluid seal between said tubing and sleeve and fluid seal between the sleeve and a the body of the connection.

Type (B) A simpler device consisting of one member having a tubular surface, with one or many external annular ridges thereon, which member enters the tubing, expanding it radially outward. The elasticity of the tubing provides a force radially inward which causes a fluid seal between the tubing and the tubular surface of the connector and the retention of the tubing by the ridges.

PROBLEMS WITH PRIOR ART

Type (A) connectors are higher in cost than type (B) and usually require a tool, such as a wrench to assemble and disassemble. No means is provided for limiting the amount the thread member can be turned, resulting in either over tightening or under tightning and subsequent failure of the connection.

Type (B) connectors offer easy assembly and low cost, but require a sharp implement to slit the tubing longitudinally to remove it, thereby damaging the connector. The tubing may also be blown off the connector by internal fluid pressure.

Both types restrict fluid flow by entering the tubing, thereby reducing the effective area through which the fluid flows at the connection.

SUMMARY OF THIS INVENTION

The present invention provides a means for connecting non-metallic tubing to a connector, or other device, without tools, and provides thereby a means for disconnecting said tubing easily without tools and without damaging the assembly.

In this invention, the tubing to be used is inserted axially into the open end of a male member provided with a flexible bitting cone, then into a female member, and sealed by an annular bead in said female member. Disassembly is accomplished by disengaging a latch, or latches, on the male member and by removing the tubing and male member by a pulling motion away from the female member.

An object of this invention is to provide a connection that facilitates quick and ready assembly of said tubing and a connector or device, by simple insertion of said tubing axially into the connector or device housing.

Another object is to minimize space requirements of connectors, by inserting the tubing into the connector, rather than the connector having a tubular surface which enters the tubing.

Another object is to eliminate the need of a threaded connector between the tubing and devices such as, valves, actuators, and the like. To accomplish this, the female member of the assembly is formed within the housing of such a device.

Another object is to minimize fluid restriction through the connector, by contacting said tubing only on its periphery.

DESCRIPTION OF DRAWING

FIG. 1 shows a partial longitudinal section of the elevation of an embodiment of the invention.

FIG. 2 shows an elevation of the male member as viewed from the top in FIG. 1.

FIG. 3 shows a partial longitudinal section of another embodiment of the invention.

FIG. 4 shows a partial section of another embodiment of the invention as it relates to housings.

FIG. 5 shows a partial section of another embodiment of the invention as it relates to a fluid seal device.

DETAILED DESCRIPTION

In the embodiment illustrated in FIGS. 1 and 2, the reference number 1 indicates a tubular male member with a serrated, converging conical section 10, having an aperture edge 1a within which a tubing 8 is to be inserted, the diameter of the aperture provided by said edge being smaller than the tubing. When said tubing 8 is inserted through the right hand end of number 1, the end of the conical section 10 flexes outwardly, thus permitting edge 1a to bite into the periphery of said tubing, thus retaining the tubing within member 1. Means, for retaining the male member 1 within a female member 2, are provided by two latches 1b, 1b located longitudinally in the tubular section 11 of member 1. It is intended that member 1 be of one molded or formed body of resilient material including conical section 10, tubular section 11 and latches 1b, 1b. One end of each latch is formed like a hook 1c and the latch mid-section is provided with a raised surface 1d to facilitate the depressing of said latch until the hook end 1c is disengaged from a groove 3a in female member 2.

The female member 2 has a bore 3 of slidable fit with tubular member 1, said bore having the above mentioned groove 3a near its opening to receive hook 1c of latch 1b on tubular member 1. Bore 3 terminates in a shoulder 5, from which extends a bore 4 within female member 2 to provide a slidable fit with non-metallic tubing 8. Bore 4, at an appropriate distance from shoulder 5, is provided with an annular bead 7 extending radially inward. Bead 9 deflects said non-metallic tubing 8 when it is inserted into said bead. This deflection causes the tubing to exert a force radially outward on the bead, thereby making a fluid seal. This sealing action is enhanced with increased fluid pressure exerting an additional radial outward force. Bore 4 terminates in a shoulder 6 to provide a stop or limit for said inserted tubing 8. A bore 7, which may have the same inside diameter as the tubing 8, extends beyond shoulder 6 into the interior of member 2.

In the embodiment of FIG. 3, the female member is in the form of a threaded connector 12. This form is illustrative of the substantial saving in metal and space requirements by adapting this invention to connectors.

In the embodiment of FIG. 4, the female member is provided as a part of a valve housing 13. This is an important adaptation which eliminates the possibility of distorting the valve body by over tightening of a connector threaded into the valve housing.

In the embodiment of FIG. 5, the female member is in the form of a body 14 having a single bore 15, similar in its operation to bore 4 of FIG. 1 by providing a fluid seal projection 16 similar to projection 9 of FIG. 1. This forms a fluid seal device for the non-metallic tubing 8.

What is claimed is:

1. A fluid coupling assembly for non-metalic tubing comprising:
    a coupling member being a connector having first and second bores therein; the first bore closest to the open end of said member containing an annular groove therein, said second bore dimensioned to slidably fit with outside diameter of tubing to be used and having at least one annular projection formed radially inward, said projection aperture being smaller than the outside diameter of said tubing, the termination of the second bore in a direction away from the first bore having a shoulder therein providing a stop or limit, a tubular member having a converging conical surface on one end, and an aperture therein of a diameter smaller than the outside diameter of said tubing said tubular member being provided with at least one sharp edge adjacent said aperture, said tubular member dimensioned to slidably fit within said said first bore, retaining means cooperatively associated with said tubular member and said groove of first bore for securely retaining said tubular member in said bore, said disengaging means associated with said retaining means for releasing said tubular member readily.

2. A coupling assembly in accordance with claim 1 wherein the tubular member combines said retaining means and said disengaging means with at least one latch located longitudinal in the tubular surface; one end of said latch formed in the shape of a hook engagable with the groove of said first bore, said latch having a depressable raised mid-section, whereby said hook may be readily disengaged from said groove.

3. A coupling assembly in accordance with claim 1 wherein said coupling member with said first and second bores comprises a portion of the housing of a device in fluid-tight connection with said coupling assembly.

* * * * *